United States Patent
Chen (10) Patent No.: US 10,175,051 B2
(45) Date of Patent: Jan. 8, 2019

(54) METHOD OF DETECTING POSITION OF HUMAN BODY, AND SYSTEM AND POSITIONING SERVER USING THE SAME

(71) Applicant: Wistron Corporation, New Taipei (TW)

(72) Inventor: Chih-Ming Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 15/289,985

(22) Filed: Oct. 11, 2016

(65) Prior Publication Data

US 2018/0023956 A1 Jan. 25, 2018

(30) Foreign Application Priority Data

Jul. 22, 2016 (TW) .............................. 105123157 A (51) Int. Cl.
| | |
|---|---|
| *G01C 21/20* | (2006.01) |
| *H04W 4/04* | (2009.01) |
| *G01S 17/88* | (2006.01) |
| *H04W 84/18* | (2009.01) |

(52) U.S. Cl.
CPC .......... *G01C 21/206* (2013.01); *G01S 17/88* (2013.01); *H04W 4/043* (2013.01); *H04W 84/18* (2013.01)

(58) Field of Classification Search
CPC ................................................. G01C 21/206
See application file for complete search history.

(56) References Cited

U.S. PATENT DOCUMENTS

| | | | | |
|---|---|---|---|---|
| 6,236,365 | B1 * | 5/2001 | LeBlanc | G01C 21/206 342/450 |
| 6,411,946 | B1 * | 6/2002 | Chaudhuri | G06Q 20/102 705/40 |
| 6,952,181 | B2 * | 10/2005 | Karr | G01C 21/206 342/450 |
| 7,558,417 | B2 * | 7/2009 | Knoplioch | G06K 9/34 382/131 |

FOREIGN PATENT DOCUMENTS

| | | |
|---|---|---|
| CN | 102802280 | 11/2012 |
| CN | 104655714 | 5/2015 |

* cited by examiner

*Primary Examiner* — Hussein Elchanti
*Assistant Examiner* — Michael A Berns
(74) *Attorney, Agent, or Firm* — JCIPRNET (57) ABSTRACT

A human body positioning method, a human body positioning system, and a positioning server are provided, adapted for positioning a human body in a specific space. Best routing paths between a positioning server and a target wireless device among wireless devices are sought according to communication quality of the wireless devices. A device positioning result is estimated according to the best routing paths. A wireless network topology formed by operating wireless devices is established. Voxels of a 3D space image are transmitted into the wireless network topology, and the human body is detected according to the voxels based on serving the operating wireless devices as a neuron of a neural network architecture associated with a body detecting model. When the human body is detected, the human body is positioned at the device positioning result.

20 Claims, 7 Drawing Sheets

METHOD OF DETECTING POSITION OF HUMAN BODY, AND SYSTEM AND POSITIONING SERVER USING THE SAME

CROSS-REFERENCE TO RELATED APPLICATION

This application claims the priority benefit of Taiwan application serial no. 105123157, filed on Jul. 22, 2016. The entirety of the above-mentioned patent application is hereby incorporated by reference herein and made a part of this specification.

BACKGROUND OF THE INVENTION

Field of the Invention

The invention relates to a human body detecting technique, and particularly relates to a human body positioning method, a human body positioning system and a positioning server.

Description of Related Art

In recent years, due to progress of wireless transmission techniques and since wireless node has characteristics of wireless and easy construction, various wireless transmission techniques are widely applied to various data transmissions, for example, wireless sensor network (WSN), ZigBee, Wi-Fi, Bluetooth, etc. Along with progress of wireless transmission and wide use of wireless communication devices, the aforementioned wireless transmission techniques are widely applied to position the wireless communication devices in specific places.

However, limited by complexity of a spatial environment and some physical characteristics of wireless signals (such as multi-path attenuation or time delay, etc.), if the spatial environment is too complicate, stableness of positioning implemented through the aforementioned wireless transmission technique is inadequate. Moreover, even if the wireless communication device can be positioned based on transmission of wireless signals, a user of the wireless communication device or a user in the specific space is not necessarily positioned accurately. For example, when a heart attack patient places a mobile phone in a distance, a location of the heart attack patient cannot be learned by positioning the mobile phone owned by the heart attack patient. Alternatively, when a person loses consciousness in a fire scene and cannot save himself, a location of the person losing consciousness cannot be learned even if a wireless device in the fire scene can be positioned. Therefore, how to accurately position a human body in a specific space by using wireless devices becomes an important issue concerned by related technicians of the field.

SUMMARY OF THE INVENTION

The invention is directed to a human body positioning method, a human body positioning system and a positioning server, which are adapted to position a human body in a specific space by using a wireless transmission technique.

The invention provides a human body positioning method, which is adapted to position a human body in a specific space. Wireless devices and a positioning server are located in the specific space. The method includes following steps. A plurality of best routing paths between the positioning server and a target wireless device among wireless devices are sought according to communication quality of the wireless devices. The best routing paths are respectively formed by operating wireless devices in the wireless devices. Then, a device positioning result of the target wireless device is estimated according to the best routing paths. A wireless network topology formed by the operating wireless devices on the best routing paths is established. A three-dimensional (3D) space image around the target wireless device is acquired. Then, original voxels of the 3D space image are transmitted into the wireless network topology, and the human body is detected according to the original voxels based on serving each of the operating wireless devices as a neuron of a neural network architecture associated with a body detecting model. If it is determined that the human body is detected, the human body is positioned at the device positioning result.

In an embodiment of the invention, the aforementioned step of transmitting the original voxels of the 3D space image into the wireless network topology, and detecting the human body according to the original voxels based on serving each of the operating wireless devices as the neuron of the neural network architecture associated with the body detecting model includes following steps. The original voxels of the 3D space image are transmitted to first layer devices of the operating wireless devices. Then, first feature information is detected according to the original voxels and the neural network architecture, and the first feature information is transmitted to second layer devices of the operating wireless devices. Then, second feature information is detected according to the first feature information and the neural network architecture, and the second feature information is transmitted to third layer devices of the operating wireless devices. Finally, the human body is detected according to the second feature information.

In an embodiment of the invention, the neural network architecture is a deep neural network, and the first layer devices, the second layer devices and the third layer devices belong to hidden layers of the deep neural network.

In an embodiment of the invention, the neural network architecture is a recurrent neural network, and each of the operating wireless devices serves as a dynamic neuron of the recurrent neural network, such that the operating wireless devices detect the human body by using the 3D space image corresponding to a time point and another 3D space image corresponding to another time point.

In an embodiment of the invention, the step of seeking the best routing paths between the positioning server and the target wireless device among the wireless devices according to communication quality of the wireless devices includes following steps. First, wireless communication connections between the wireless devices are established according to wireless connection capabilities of the wireless devices, such that the wireless devices form an ad-hoc network. Then, communication quality parameters of the wireless communication connections are obtained, and the best routing paths between the positioning server and the target wireless device among the wireless devices are sought according to the communication quality parameters of the wireless communication connections.

In an embodiment of the invention, the step of estimating the device positioning result of the target wireless device according to the best routing paths includes following steps. Positioning locations respectively corresponding to the best routing paths is obtained. A statistical operation is performed to the positioning locations to obtain the device positioning result.

In an embodiment of the invention, the human body positioning method further includes following steps. Semantic features of the detected human body are obtained according to another neural network architecture associated with a body recognition model. The semantic features are compared with semantic samples of human body samples to recognize that the human body is one of the human body samples.

In an embodiment of the invention, the step of obtaining the semantic features of the detected human body according to the another neural network architecture associated with the body recognition model includes following steps. Gait vectors of the human body is obtained, and the gait vectors are transmitted into the wireless network topology, to obtain the semantic features according to the gait vectors based on serving each of the operating wireless devices as a neuron of the another neural network architecture.

According to another aspect, the invention provides a human body positioning system, which is adapted to position a human body in a specific space. The human body positioning system includes a positioning server and wireless devices located in the specific space. The positioning server seeks best routing paths between the positioning server and a target wireless device among the wireless devices according to communication quality of the wireless devices, and estimates a device positioning result of the target wireless device according to the best routing paths. The best routing paths are respectively formed by operating wireless devices in the wireless devices, and the positioning server establishes a wireless network topology formed by the operating wireless devices. The target wireless device obtains a three-dimensional (3D) space image around the target wireless device, and transmits original voxels of the 3D space image into the wireless network topology. Each of the operating wireless devices serving as a neuron of a neural network architecture associated with a body detecting model detects the human body according to the original voxels. If the positioning server or one of the operating wireless devices determines that the human body is detected, the positioning server positions the human body to the device positioning result.

According to another aspect, the invention provides a positioning server, which is adapted to position a human body in a specific space. Wireless devices are located in the specific space to form an ad-hoc network, and the positioning server includes a communication device and a processor. The processor seeks best routing paths between the positioning server and a target wireless device among the wireless devices according to communication quality of the wireless devices. The best routing paths are respectively formed by operating wireless devices in the wireless devices. The processor estimates a device positioning result of the target wireless device according to the best routing paths. The processor establishes a wireless network topology formed by the operating wireless devices. The processor detects the human body by taking each of the operating wireless devices as a neuron of a neural network architecture associated with a body detecting model. If it is determined that the human body is detected, the processor positions the human body to the device positioning result.

According to the above description, in one embodiment of the invention, Best routing paths between the positioning server and the target wireless device among the wireless devices is sought according to communication quality of the wireless devices, and the operating wireless devices on the best routing paths respectively serve as the neurons of the neural network architecture. By using each of the operating wireless devices to respectively execute an operation of at least one single neuron and transmitting an operation result of the single neuron through wireless transmission, the human body in the 3D space image captured by the target wireless device is detected through cooperation of the operating wireless devices, so as to position the detected human body to the location where the target wireless device is located. In this way, positioning stability limited by space complexity and signal characteristics is improved, so as to accurately position the human body in the specific space.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to further convey the spirit of the invention, embodiments are provided below to describe the invention in detail.

Figure 1:
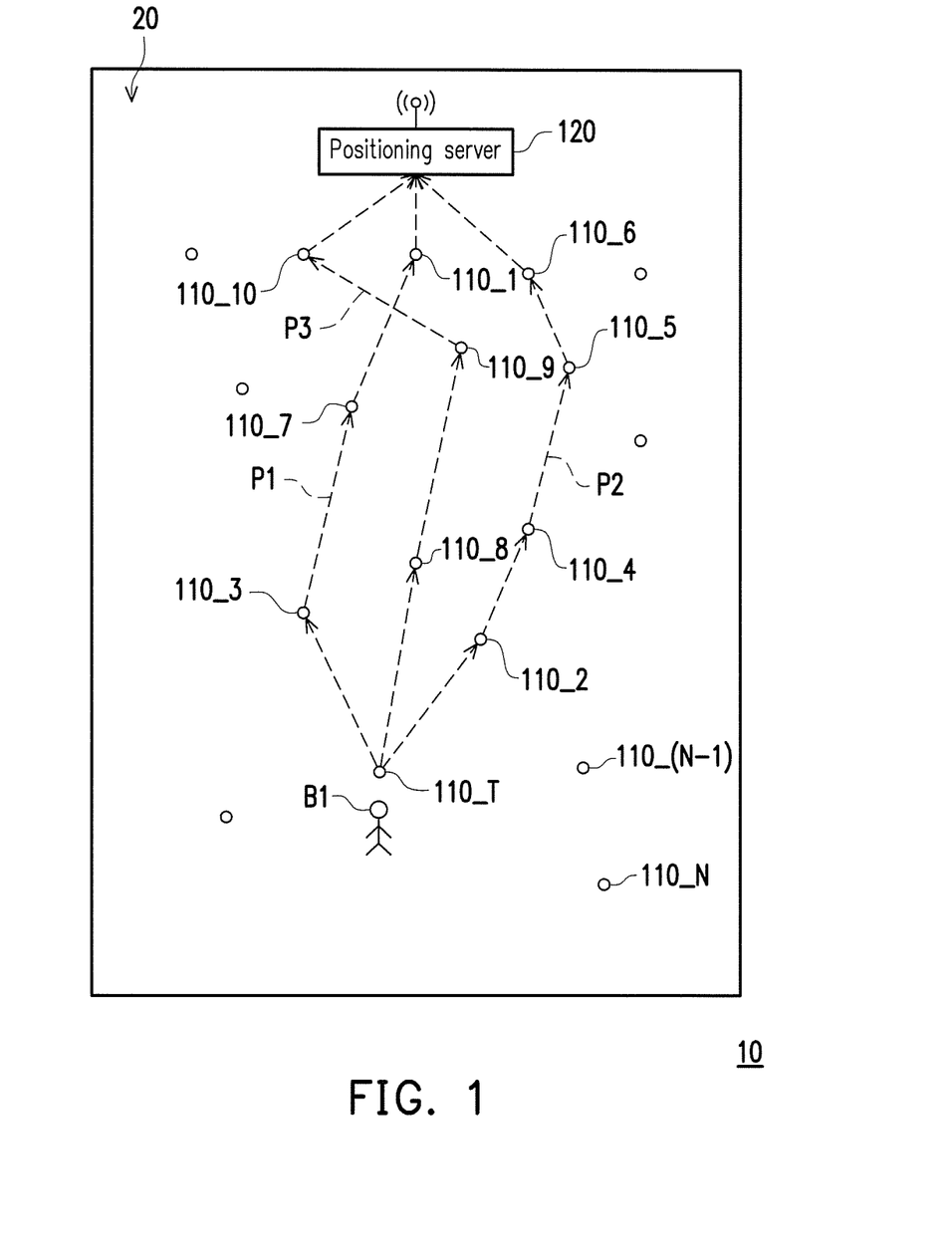
FIG. 1 is a schematic diagram of a human body positioning system according to an embodiment of the invention.

FIG. 1 is a schematic diagram of a human body positioning system according to an embodiment of the invention. Referring to FIG. 1, the human body positioning system 10 is adapted to position a human body B1 in a specific space 20. In an embodiment of the invention, the specific space 20 is, for example, a room space of a building, though the invention is not limited thereto. The human body positioning system 10 includes a positioning server 120 and N wireless devices 110_1, 110_2, 110_T, . . . , 110_(N-1), 110_N in the specific space 20, where N is a positive integer. The positioning server 120 can be a computer device having a wireless communication capability, or can be composed of an access point (AP) having the wireless communication capability and a computer device, which is not limited by the invention. The wireless devices 110_1-110_N are, for example, electronic device having the wireless communication capability such as smart phones, personal digital assistants, tablet personal computers, notebook computers, game machines, etc., or wireless sensing devices having the wireless communication capability distributed in the specific space 20. The wireless devices 110_1-110_ON support a same wireless communication protocol standard, so as to transmit message with each other through wireless connections. The aforementioned wireless communication protocol standard is, for example, an IEEE 802.11 standard, an IEEE 802.15.4 standard, a WiFi standard, a Bluetooth standard or a ZigBee wireless communication protocol standard (ZigBee), which is not limited by the invention.

Referring to FIG. 1, the embodiment of FIG. 1 performs human body detection through image data captured by the wireless device 110_T, so that the wireless device 110_T is referred to as a target wireless device (which is indicated as a target wireless device 110_T).

In an embodiment of the invention, based on the wireless connection capability of the wireless devices 110_1-110_N, the wireless devices 110_1-110_N establish wireless communication connections among the wireless devices 110_1-110_N, such that the wireless devices 110_1-110_N form an ad-hoc network. Further, based on the wireless communication capability of the wireless devices 110_1-110_N, two wireless devices within a predetermined distance may establish the wireless communication connection to communicate with each other by receiving wireless signals from each other. It should be noted that two wireless devices within the predetermined distance probably cannot establish the wireless communication connection due to space complexity and shielding of obstacles. Moreover, the communication quality of the wireless communication connections among the wireless devices 110_1-110_N can be estimated. Under the architecture of the ad-hoc network, the wireless devices 110_1-110_N in the specific space 20 may directly exchange data with the positioning server 120, or indirectly exchange data with the positioning server 120 through a multi-hopping manner.

In an embodiment of the invention, the positioning server 120 obtains communication quality parameters of the wireless communication connections among the wireless devices 110_1-110_N. For example, the communication quality parameter is, for example, a received signal strength indication (RSSI), a signal-to-noise ratio (SNR), a packet error rate (PER), a packet error loss rate (PELR), etc., though the invention is not limited thereto. Further, after the wireless devices 110_1-110_N establish the wireless communication connections with the surrounding wireless devices, the wireless devices 110_1-110_N may obtain the communication quality parameters of the wireless communication connections, and transmit the communication quality parameters to the positioning server 120. For example, the positioning server 120 may receive the communication quality parameter of the wireless communication connection between the wireless device 110_6 and the wireless device 110_5. In this way, the positioning server 120 may obtain the communication quality parameter estimated by each of the wireless devices 110_1-110_N.

In an embodiment of the invention, the positioning server 120 seeks best routing paths between the positioning server 120 and the target wireless device 110_T among the wireless devices 110_1-110_N according to the communication quality parameters of the wireless communication connections. For example, the positioning server 120 may execute an active Q-Learning algorithm according to the communication quality parameters between the wireless devices 110_1-110_N to obtain best routing paths. Taking the embodiment of FIG. 1 as an example, the positioning server 120 may obtain best routing paths P1-P3, though the invention is not limited thereto. The best routing paths P1-P3 represent routing paths with reliable communication quality between the target wireless device 110_T and the positioning server 120. The best routing paths P1-P3 are formed by the wireless communication connections between the wireless devices 110_1-110_10, 110_T. The best routing paths P1-P3 are respectively formed by operating wireless devices in the wireless devices 110_1-110_N. Taking the embodiment of FIG. 1 as an example, the best routing path P1 is formed by the wireless devices 110_3, 110_7, 110_1; the best routing path P2 is formed by the wireless devices 110_2, 110_4, 110_5, 110_6; and the best routing path P3 is formed by the wireless devices 110_8, 110_9, 110_10.

In an embodiment of the invention, after the best routing paths P1-P3 are established, the positioning server 120 estimates a device positioning result of the target wireless device 110_T according to the best routing paths P1-P3. Further, the positioning server 120 obtains positioning locations respectively corresponding to the best routing paths P1-P3. Further, the wireless devices 110_1-110_N may respectively learn relative location relationships between themselves and the surrounding wireless devices through wireless signal transmission. Taking the best routing path P1 as an example, the positioning server 120 may obtain relative location relationships between itself and the wireless device 110_1, between the wireless device 110_1 and the wireless device 110_7, between the wireless device 110_7 and the wireless device 110_3, and between the wireless device 110_3 and the target wireless device 110_T. In case that the positioning server 120 learns its location, the positioning server 120 may estimate the positioning location of the target wireless device 110_T according to the relative location relationships associated with the best routing path P1. Similarly, the positioning server 120 may estimate the positioning location of the target wireless device 110_T according to the relative location relationships associated with the best routing path P2, and may estimate the positioning location of the target wireless device 110_T according to the relative location relationships associated with the best routing path P3. It should be noted that the positioning locations are different based on different wireless communication qualities and communication environments.

In an embodiment of the invention, the positioning server 120 performs a statistical operation on the positioning locations to obtain the device positioning result of the target wireless device. Namely, the statistical result of the positioning locations is obtained. Taking the embodiment of FIG. 1 as an example, the positioning server 120 may obtain three positioning locations associated with the best routing paths P1-P3, and the positioning server 120 performs the statistical operation on the three positioning locations associated with the best routing paths P1-P3 to obtain the device positioning result of the target wireless device 110_T. For example, the statistical operation can be a mean operation, a mod operation, a median operation, etc., which is not limited by the invention.

Figure 2:
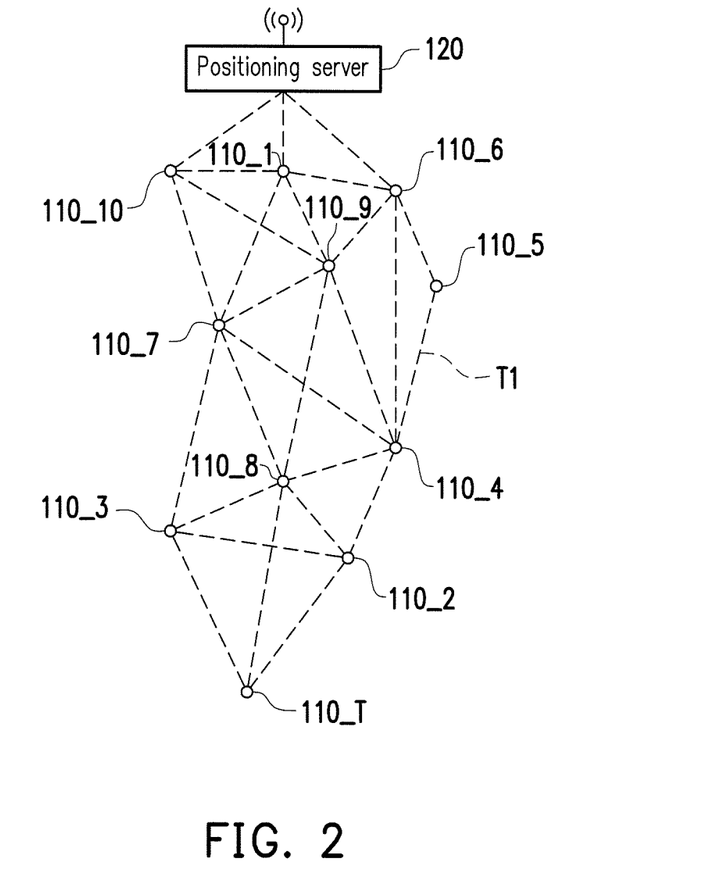
FIG. 2 is a schematic diagram of a wireless network topology according to an embodiment of the invention.

Moreover, in the invention, the wireless devices on the best routing paths are applied to perform human body detection. Referring to FIG. 1, after the best routing paths P1-P3 are established, the wireless devices 110_1-110_10 on the best routing paths P1-P3 are referred to as operating wireless devices (which are indicated as operating wireless devices 110_1-110_10). In an embodiment, the positioning server 120 establishes a wireless network topology formed by the operating wireless devices 110_1-110_10. FIG. 2 is a schematic diagram of a wireless network topology according to an embodiment of the invention. Referring to FIG. 2, after the positioning server 120 determines the best routing paths P1-P3, the positioning server 120 establishes a wireless network topology T1 formed by the operating wireless devices 110_1-110_10, and record topology information of the wireless network topology T1.

In an embodiment of the invention, the target wireless device 110_T obtains a three-dimensional (3D) space image around the target wireless device 110_T, and transmits original voxels of the 3D space image into the wireless network topology. In the embodiment of FIG. 1, the target wireless device 110_T, for example, transmits the original voxels of the 3D space image to the operating wireless devices 110_3, 110_8, 110_2. Then, each of the operating wireless devices 110_1-110_10 serving as at least one neuron of a neural network architecture associated with a body detecting model detects the human body B1 according to the original voxels. If the positioning server 120 or one of the operating wireless devices 110_1-110_10 determines that the human body B1 is detected, the positioning server 120 positions the human body to a device positioning result of the target wireless device 110_T. The details about how to perform human body detection through the neural network architecture constructed by the operating wireless devices is described below.

Figure 3:
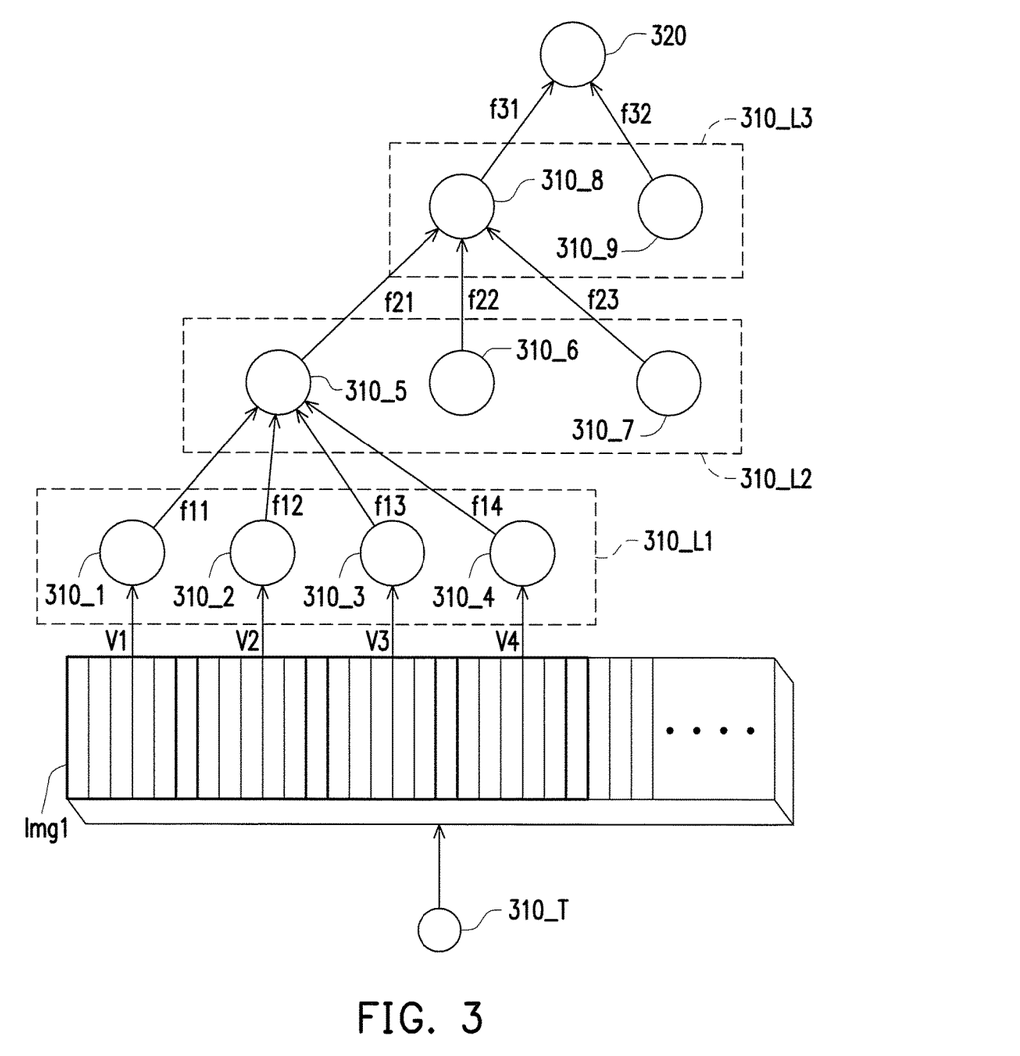
FIG. 3 is a schematic diagram of a neural network architecture according to an embodiment of the invention.

FIG. 3 is a schematic diagram of a neural network architecture according to an embodiment of the invention. Referring to FIG. 3, a target wireless device 310_T may, for example, capture a 3D space image Img1 of the surrounding environment through a tomographic imaging technique or an infrared imaging technique, where the 3D space image Img1 includes original voxels. In the embodiment of FIG. 3, the target wireless device 310_T transmits the original voxels of the 3D space image Img1 to the wireless network topology including the operating wireless devices 310_1-310_9. Each of the operating wireless devices 310_1-310_9 serving as at least one neuron of the neural network architecture detects the human body according to the original voxels.

Further, the target wireless device 310_T respectively transmits original voxels V1, V2, V3, V4 of the 3D space image Img1 to first layer devices 310_L1 of the operating wireless devices 310_1-310_9, where the first layer devices 310_L1 includes the operating wireless devices 310_1-310_4. To be specific, the target wireless device 310_T divides all of the original voxels of the 3D space image Img1 to obtain partial original voxels V1, V2, V3, V4, and sequentially distributes the partial original voxels V1, V2, V3, V4 to the operating wireless devices 310_1-310_4. For example, the operating wireless device 310_1 may acquire the partial original voxel V1.

Then, the operating wireless devices 310_1-310_4 detects first feature information f11, f12, f13, f14 according to the original voxels V1, V2, V3, V4 and the neural network architecture, and transmit the first feature information f11, f12, f13, f14 to the operating wireless device 310_4 of second layer devices 310_L2 in the operating wireless devices 310_1-310_9. The second layer devices 310_L2 further include the operating wireless devices 310_6, 310_7. Then, the operating wireless device 310_5 detects a second feature information f21 according to the first feature information f11, f12, f13, f14 by using the body detecting model of the neural network architecture. Similarly, the operating wireless devices 310_6, 310_7 detect second feature information f22, f23 according to the first feature information generated by the other first layer devices by using the body detecting model of the neural network architecture. The operating wireless device 310_5 transmits the second feature information f21 to third layer devices 310_L3 of the operating wireless devices. Finally, the operating wireless device 310_8 detects a human body feature f31 of the human body record in a part of the original voxels according to the second feature information f21, f22, f23. In this way, if the 3D space image includes the image of the human body, the positioning server 320 may obtain human body features f31, f32 from the operating wireless devices 310_8, 310_9 in the third layer device 310_L3.

It should be noted that the body detecting model of the neural network architecture is, for example, a joint model trained based on a local model, a global model and a pairwise model, which is not limited by the invention. In the embodiment of FIG. 3, the first feature information f11, f12, f13, f14 can be polygon features, the second feature information f21, f22, f23 can be body part features, though the invention is not limited thereto. The types of the first feature information and the second feature information can be designed according to an actual application requirement, which are not limited by the invention. In the embodiment of FIG. 3, the neural network architecture is a deep neural network, the first layer devices 310_L1, the second layer devices 310_L2 and the third layer devices 310_L3 belong to hidden layers of the deep neural network. However, in the embodiment of FIG. 3, the neural network architecture including three hidden layers is taken as an example for description, though the invention is not limited thereto, and the number of the hidden layers can be designed according to an actual application requirement. Moreover, in the embodiment of FIG. 3, one operating wireless device can be in charge of an operation task of one neuron, though the invention is not limited thereto. In another embodiment, one operating wireless device can be in charge of operation tasks of more than one neuron. For example, one operating wireless device may simultaneously serve as the first layer device and the second layer device to be in charge of the operation tasks of the neurons of different hidden layers.

Figure 4:
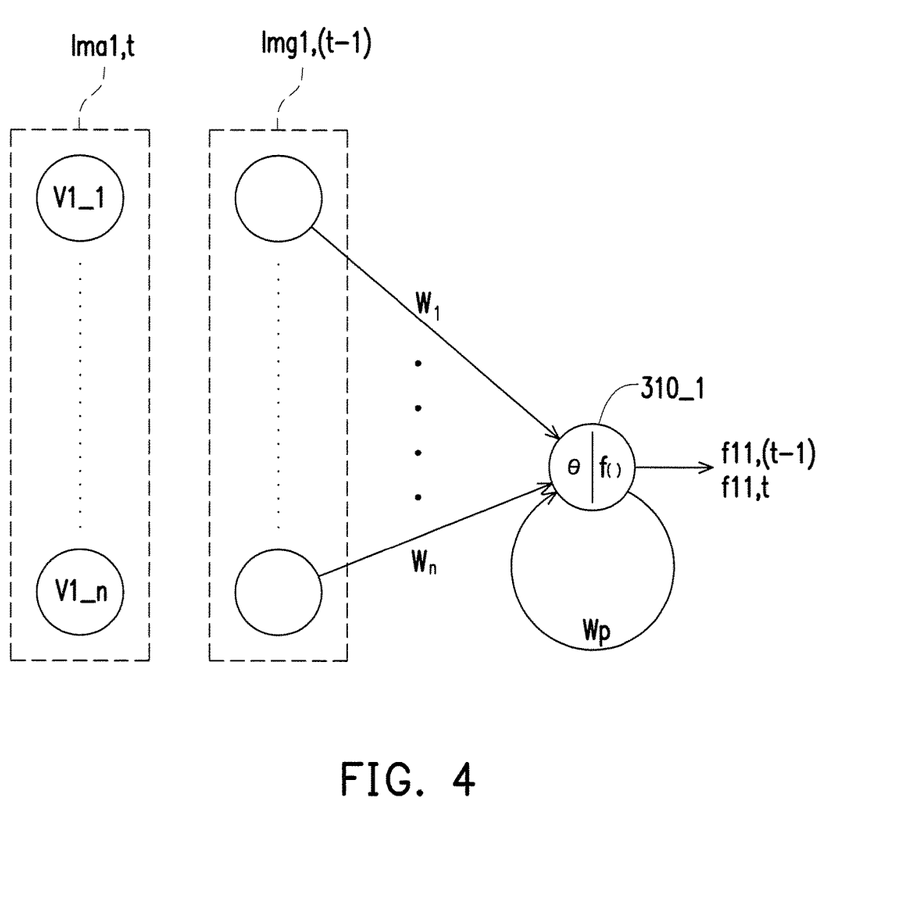
FIG. 4 is a schematic diagram of a dynamic neuron according to an embodiment of the invention.

In an embodiment of the invention, the neural network architecture may be a recurrent neural network, and each of the operating wireless devices serves as a dynamic neuron of the recurrent neural network, such that the operating wireless device detects the human body by using the 3D space image corresponding to a time point and another 3D space image corresponding to another time point. FIG. 4 is a schematic diagram of a dynamic neuron according to an embodiment of the invention. Referring to FIG. 4, taking the operating wireless device 310_1 of FIG. 3 as an example, the operating wireless device 310_1 serving as one neuron may detect the human body by using a 3D space image Img1,t corresponding to one time point t and another 3D space image Img1,(t-1) corresponding to another time point (t-1). At the time point t, when the operating wireless device 310_1 serving as one neuron receives n (n is a positive integer) input values (represented by original voxels V1_1-V1_n), the operating wireless device 310_1 may calculate a function (represented by $f(\ )$) based on the original voxels V1_1-V1_n, n weight values (represented by W1-Wn), an output value f11,(t-1) of a previous time point, a weight value (represented by Wp) assigned to the output value of the previous time point, and an offset (represented by θ), so as to generate an output value (represented by f11,t). In this way, the output value f11,t of the time point t is related to the output value f11,(t-1) of the previous time point (t-1). Although only one operating wireless device is taken as an example for description, the other operating wireless devices may also perform the human body detection according to the 3D space images captured at different time points.

It should be noted that the positioning server of the invention may further perform character identification according to image information of the human body. Namely, if the positioning server includes a pre-established sample database for known people, the positioning server may further identify a specific character corresponding to the human body by comparing the image information of the human body with samples in the sample database. In an embodiment of the invention, the positioning server may obtain semantic features of the detected human body according to another neural network architecture associated with a body recognition model. The positioning server compares the semantic features with semantic samples of human body samples to recognize that the human body is one of the human body samples. It is known that the positioning server has established the sample database including the semantic samples of the human body samples.

In an embodiment of the invention, the target wireless device may obtain gait vectors of the human body, and transmit the gait vectors to the operating wireless devices in the wireless network topology. The wireless network topology can also be established according to the aforementioned best routing paths. Therefore, based on serving each of the operating wireless devices as a neuron of another neural network architecture and based on the gait vectors, the positioning server may obtain the semantic features of the human body. However, the neural network architecture used for capturing the semantic features may refer to the embodiment of FIG. 3, and it should be noted that the body recognition model of the other neural network architecture can be a deep semantic similarity model, though the invention is not limited thereto. Then, in an embodiment of the invention, by calculating a posterior probability, the positioning server may find the human body sample with the highest similarity from the human body samples.

Figure 5A:
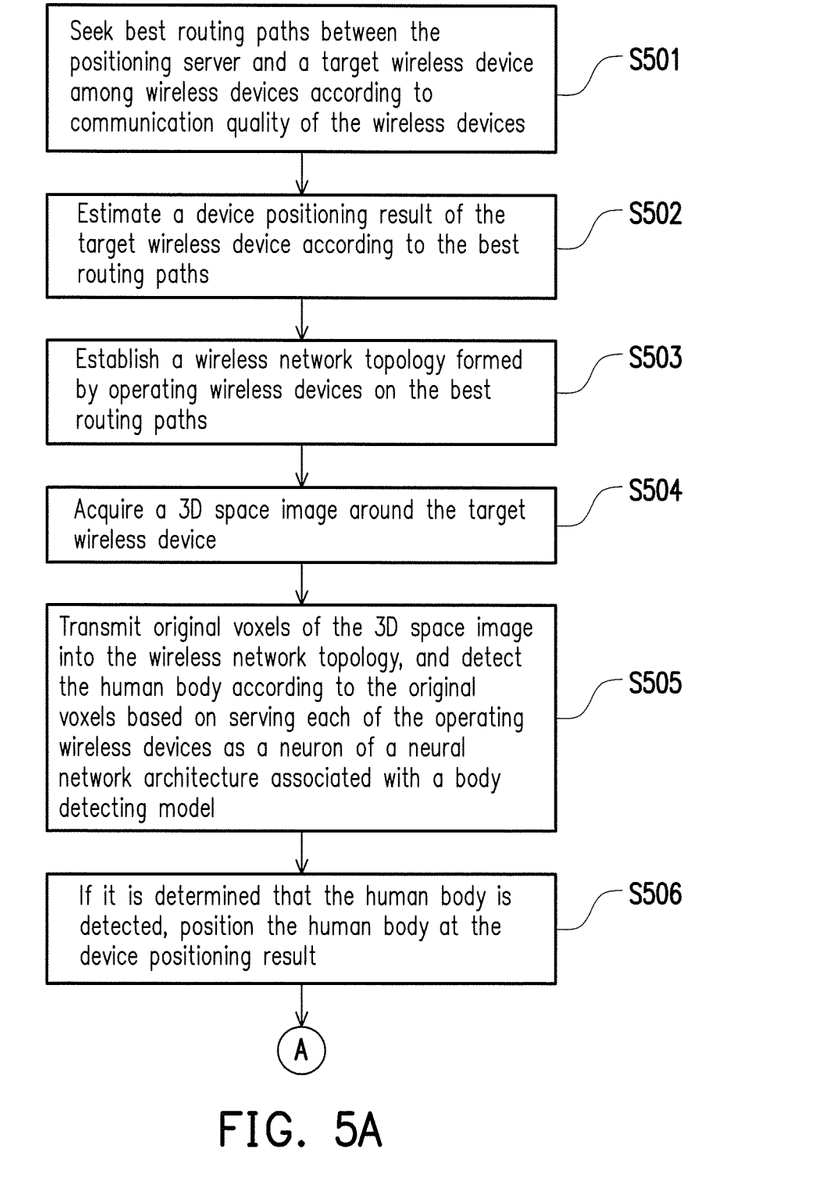
FIG. 5A and FIG. 5B are flowcharts illustrating a human body positioning method according to an embodiment of the invention.
Figure 5B:
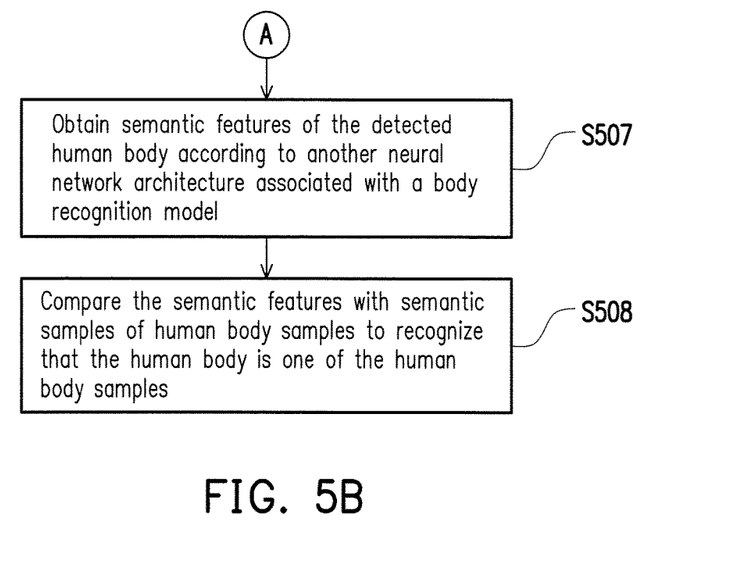

FIG. 5A and FIG. 5B are flowcharts illustrating a human body positioning method according to an embodiment of the invention. Referring to FIG. 5A, in step S501, best routing paths between the positioning server and a target wireless device among wireless devices are sought according to communication quality of the wireless devices. In step S502, a device positioning result of the target wireless device is estimated according to the best routing paths. In step S503, a wireless network topology formed by the operating wireless devices on the best routing paths is established. In step S504, a 3D space image around the target wireless device is acquired. In step S505, original voxels of the 3D space image are transmitted into the wireless network topology, and the human body is detected according to the original voxels based on serving each of the operating wireless devices as a neuron of a neural network architecture associated with a body detecting model. In step S506, if it is determined that the human body is detected, the human body is positioned at the device positioning result. Seeking of the best routing paths and how to use the neural network architecture to detect the human body have been described in the aforementioned embodiment, so that details thereof are not repeated. Therefore, by analysing the 3D space image captured by the wireless device, the positioning server may determine whether the human body is detected and position the location of the human body.

Referring to FIG. 5B, after positioning of the human body is completed, in step S507, semantic features of the detected human body is obtained according to another neural network architecture associated with a body recognition model. In step S508, the semantic features are compared with semantic samples of human body samples to recognize that the human body is one of the human body samples. The method of using the neural network architecture to detect the human body has been described in the aforementioned embodiment, and detail thereof is not repeated. In this way, by analysing the 3D space image captured by the wireless device, the positioning server may further obtain a character identification result of the human body.

Figure 6:
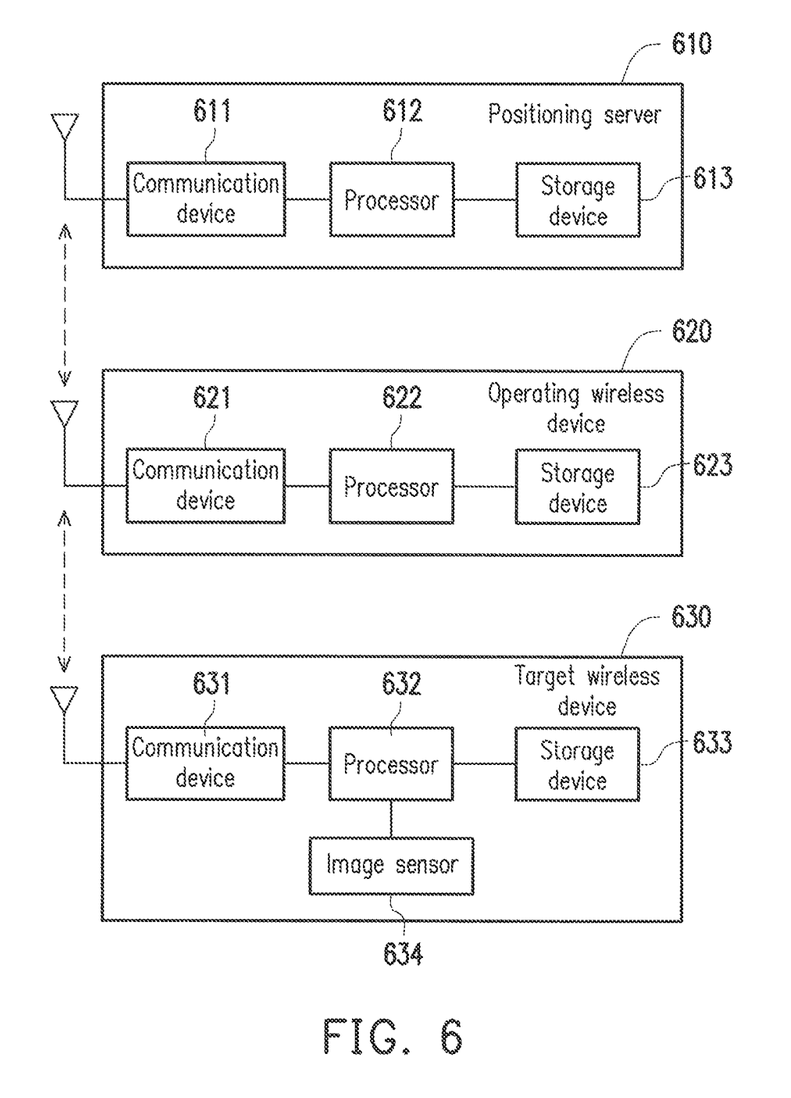
FIG. 6 is a block schematic diagram of a positioning server and wireless devices according to an embodiment of the invention.

FIG. 6 is a block schematic diagram of a positioning server and wireless devices according to an embodiment of the invention. Referring to FIG. 6, the positioning server 610 includes a communication device 611, a processor 612 and a storage device 613. The processor 612 is coupled to the communication device 611 and the storage device 613. The wireless device 620 (the operating wireless device) includes a communication device 621, a processor 622 and a storage device 623. The processor 622 is coupled to the communication device 621 and the storage device 623. The target wireless device 630 includes a communication device 631, a processor 632, a storage device 633 and an image sensor 634. The processor 632 is coupled to the communication device 631, the storage device 633 and the image sensor 634.

The processor 612, the processor 622, the processor 632 are, for example, a central processing unit (CPU) consisting of a single core or multiple course, or other programmable general purpose or special purpose microprocessor, a digital signal processor (DSP), a programmable controller, an application specific integrated circuits (ASIC), a programmable logic device (PLD) or other similar devices or a combination of the devices. The processors 612, 622 and 632 are configured to execute related functions described in the embodiments of FIG. 1 to FIG. 5.

The storage device 613, the storage device 623 and the storage device 633 are, for example, any type of fixed or movable random access memories (RAM), read-only memories (ROM), flash memories, hard disks, or other similar devices or a combination of the devices, and are used for recording software instructions and various software programs adapted to be executed by the processors 612, 622, 632. The processors 612, 622, 632 may respectively access the software elements stored in the storage device 613, the storage device 623 and the storage device 633 to execute related functions of the embodiments of FIG. 1 to FIG. 5. Moreover, the storage device 613 of the positioning server 610 may further record the topology information of the wireless network topology and the sample database used for character identification The communication device 611, the communication device 621, the communication device 631 respectively include an antenna device, a transceiver circuit and communication protocol circuit supporting a wireless communication protocol standard, so as to establish a wireless communication connection with other wireless devices supporting the same wireless communication protocol standard. For example, hardware and software elements of the communication device 611, the communication device 621 and the communication device 631 may support an IEEE 802.11 standard, an IEEE 802.15.4 standard, a WiFi standard, a Bluetooth standard or a ZigBee standard to provide a wireless communication function. The image sensor 634 is used for capturing the 3D space image, and is, for example, an infrared image sensor or a tomographic imaging sensor.

In summary, by using each of the operating wireless devices to respectively execute an operation of at least one neuron and using the wireless devices to transmit an operation result of the neuron, the human body in the 3D space image captured by the target wireless device can be detected through cooperation of the operating wireless devices, so as to position the detected human body to a location where the target wireless device is located. In this way, positioning stability limited by space complexity and signal characteristics is improved, so as to accurately position the human body in the specific space. Moreover, by using the operating wireless devices in cooperation to share the operation tasks of the neural network, an operating load of the positioning server is greatly decreased, and a processing performance of the human body positioning system is improved based on distributed computation. Further, the best routing paths and the wireless network topology can be dynamically varied along with time, so that the human body positioning system of the invention is adapted to a dynamic moving environment of the wireless devices, and the operation tasks of the wireless devices can be adaptively distributed.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method of detecting a position of a human body in a specific space, wherein a plurality of wireless devices and a positioning server being located in the specific space, the method comprising:

seeking, using a transceiver and a processor executing instructions stored in a memory of the positioning server, a plurality of best routing paths between the positioning server and a target wireless device among the wireless devices according to communication quality of the wireless devices;

identifying, using the processor executing further instructions stored in the memory of the positioning server, a plurality of operating wireless devices among the wireless devices according to the best routing paths, wherein the best routing paths are respectively formed by wireless communication connections between the plurality of operating wireless devices of the wireless devices, the positioning server and the target wireless device, wherein the positioning server and the target wireless device are two ends of each of the best routing paths, and data is transferred between the positioning server and the target wireless device of one best routing path via one or more operating; wireless devices on that one best routing path;

estimating, using the processor executing further instructions stored in the memory of the positioning server, a device positioning result of the target wireless device according to the best routing paths, wherein the device positioning result indicates a position of the target wireless device in the specific space;

establishing, using the processor executing further instructions stored in the memory of the positioning server, a neural network architecture by setting the operating wireless devices as a plurality of neurons of the neural network architecture for detecting human body image, wherein the neural network architecture comprises a first layer having a plurality of first neurons, and one or more second layers having a plurality of second neurons, and a third layer having third neurons;

capturing, using an image sensor of the target wireless device, a three-dimensional space image of a space around the target wireless device, wherein all original voxels of the three-dimensional space image are divided into a plurality of partial original voxels by using a processor executing instructions stored in a memory of the target wireless device;

distributing respectively, using a transceiver and the processor executing further instructions stored in the memory of the target wireless device, the plurality of partial original voxels of the three-dimensional space image to the operating transceiver of the first neurons;

respectively performing, using corresponding transceivers and corresponding processors executing corresponding instructions stored in corresponding memories of the plurality of neurons of neural network architecture, image detecting operations to generate a plurality of feature information according to the plurality of partial original voxels and the neural network architecture, wherein a plurality of last generated feature information generated by the third neurons are transmitted to the position server;

determining using the processor executing further instructions stored in the memory of the position server, whether an image of the human body exists in the three-dimensional space image according to the received last generated feature information and a plurality of target feature samples stored in the memory of the position server; and in response to determining that the image of the human body exists in the three-dimensional space image, determining, using the processor executing further instructions stored in the memory of the position server, that the position of the human body is the device positioning result.

2. The method as claimed in claim 1, wherein the step of performing image detecting operations respectively, using corresponding transceivers and corresponding processors executing corresponding instructions stored in corresponding memories of the plurality of neurons of neural network architecture, to generate a plurality of feature information according to the plurality of partial original voxels and the neural network architecture comprises:

respectively performing, using corresponding processors executing corresponding instructions stored in corresponding memories of the first neurons, first image detecting operations to the plurality of partial original voxels to generate a plurality of first feature information, and transmitting respectively, using corresponding transceivers of the first neurons, the plurality of first feature information to the second neurons;

respectively performing, using corresponding processors executing corresponding instructions stored in corresponding memories of the second neurons, second image detecting operations to the first image information to generate a plurality of second feature information, and transmitting respectively, using corresponding transceivers of the second neurons, the plurality of second feature information to the third neurons; and respectively performing, using corresponding processors executing corresponding instructions stored in corresponding memories of the third neurons, third image detecting operations to the second image information to generate a plurality of third feature information, and transmitting respectively, using corresponding transceivers of the third neurons, the plurality of third feature information to the position server, wherein the third feature information is the last generated feature information;

determining, using the processor executing further instructions stored in the memory of the position server, that the image of the human body exists in the three-dimensional space image when one of the third feature information matches one of the plurality of target feature samples.

3. The method as claimed in claim 2, wherein the neural network architecture is a deep neural network, and the first layer, the second layer and the third layer belong to hidden layers of the deep neural network.

4. The method as claimed in claim 1, wherein the neural network architecture is a recurrent neural network, and each of the operating wireless devices is set as a dynamic neuron of the recurrent neural network, and the operating wireless devices detect the image of the human body by using the three-dimensional space image of the space corresponding to a time point and another three-dimensional space image of the space corresponding to another time point.

5. The positioning method as claimed in claim 1, wherein the step of seeking the best routing paths between the positioning server and the target wireless device among the wireless devices according to communication quality of the wireless devices comprises:
   establishing, using the corresponding transceivers and the corresponding processors executing corresponding further instructions stored in the corresponding memories of the wireless devices, the wireless communication connections between the wireless devices according to wireless connection capabilities of the wireless devices, such that the wireless devices form an ad-hoc network; and
   obtaining, using the transceiver and the processor executing further instructions stored in the memory of the positioning server, communication quality parameters of the wireless communication connections, and seeking the best routing paths between the positioning server and the target wireless device among the wireless devices according to the communication quality parameters of the wireless communication connections.

6. The method as claimed in claim 1, wherein the step of estimating the device positioning result of the target wireless device according to the best routing paths comprises:
   obtaining, using the processor executing further instructions stored in the memory of the positioning server, positioning locations respectively corresponding to the best routing paths; and
   performing, using the processor executing further instructions stored in the memory of the positioning server, a statistical operation to the positioning locations to obtain the device positioning result.

7. The method as claimed in claim 1, further comprising:
   obtaining, using the processor executing further instructions stored in the memory of the positioning server, semantic features from the last generated feature information; and
   comparing, using the processor executing further instructions stored in the memory of the positioning server, the semantic features with semantic samples of the target feature samples to recognize that the image of the human body is one of the target feature samples.

8. The method as claimed in claim 7, wherein the step of obtaining the semantic features of the human body according to the another neural network architecture for detecting human body image comprises:
   obtaining, using the processor executing further instructions stored in the memory of the target wireless device, gait vectors of the human body, and transmitting the gait vectors into the another neural network architecture to obtain the semantic features according to the gait vectors,
   wherein each of the operating wireless devices is set as a neuron of the another neural network architecture.

9. A system of detecting a position of a human body in a specific space, the system comprises:
   a positioning server, located in the specific space, wherein the positioning server comprises a server transceiver, a server processor and a server memory; and
   a plurality of wireless devices, located in the specific space, wherein the server processor executes instructions stored in the server memory to seek a plurality of best routing paths between the positioning server and a target wireless device among the wireless devices according to communication quality of the wireless devices, wherein the target wireless device comprises an image sensor a target transceiver a target processor and a target memory,
   wherein the server processor executes further instructions stored in the server memory to identify a plurality of operating wireless devices among the wireless devices according to the best routing paths wherein each of the operating wireless devices comprise an operating transceiver, an operating processor and an operating memory, wherein the best routing paths are respectively formed by wireless communication connections between the plurality of operating wireless devices of the wireless devices, the positioning server and the target wireless device, wherein the positioning server and the target wireless device are two ends of each of the best routing paths, and data is transferred between the positioning server and the target wireless device of one best routing path via one or more operating wireless devices on that one best routing path,
   wherein the server processor executes further instructions stored in the server memory to estimate a device positioning result of the target wireless device according to the best routing paths, wherein the device positioning result indicates a position of the target wireless device in the specific space,
   wherein the server processor executes further instructions stored in the server memory to establish a neural network architecture by setting the operating-wireless devices as a plurality of neurons of the neural network architecture for detecting human body image, wherein the neural network architecture comprises a first layer having a plurality of first neurons, and one or more second layers having a plurality of second neurons, and a third layer having third neurons,
   wherein the image sensor is configured to capture a three-dimensional space image of a space around the target wireless device wherein all the original voxels of the three-dimensional space image are divided into a plurality of partial original voxels by the target processor executing instructions stored in the target memory,
   wherein the target processor executes further instructions stored in the target memory to distribute respectively the plurality of partial original voxels of the three-dimensional space image to operating transceivers of the first neurons via the target transceiver,
   wherein corresponding operating processors execute corresponding instructions stored in corresponding operating memories of the plurality of neurons of neural network architecture to respectively perform image detecting operations to generate a plurality feature information according to the plurality of partial original voxels and the neural network architecture, wherein a plurality of last generated feature information generated by the third neurons are transmitted to the position server,
   wherein the server processor executing further instructions stored in the server memory to determine whether an image of the human body exists in the three-dimensional space image according to the received last generated feature information and a plurality of target feature samples stored in the server memory, wherein in response to determining that the image of the human body exists in the three-dimensional space image, the server processor executing further instructions stored in the server memory to determine that the position of the human body is the device positioning result.

10. The system as claimed in claim 9,
wherein corresponding operating processors of the first neurons are configured to respectively perform first image detecting operations to the plurality of partial original voxels to generate a plurality of first feature information, and transmit the plurality of first feature information to the second neurons via corresponding operating transceivers of the first neurons,
wherein corresponding operating processors of the second neurons are configured to perform second image detecting operations to the first image information to generate a plurality of second feature information, and transmit the plurality of second feature information to the third neurons via corresponding operating transceivers of the second neurons,
wherein corresponding operating processors of the third neurons are configured to perform third image detecting operations to the second image information to generate a plurality of third feature information, and transmit respectively the plurality of third feature information to the position server via corresponding transceivers of the third neurons, wherein the third feature information is the last generated feature information,
wherein the server processor is configured to determine that the image of the human body exists in the three-dimensional space image when one of the third feature information matches one of the plurality of target feature samples.

11. The system as claimed in claim 10, wherein the neural network architecture is a deep neural network, and the first layer devices, the second layer devices and the third layer devices belong to hidden layers of the deep neural network.

12. The system as claimed in claim 9, wherein the neural network architecture is a recurrent neural network, and each of the operating wireless devices is set as a dynamic neuron of the recurrent neural network, and the operating wireless devices detect image of the human body by using the three-dimensional space image of the space corresponding to a time point and another three-dimensional space image of the space corresponding to another time point.

13. The system as claimed in claim 9, wherein the corresponding transceivers of the wireless devices establish wireless communication connections between the wireless devices according to wireless connection capabilities of the wireless devices, such that the wireless devices form an ad-hoc network,
wherein the server processor obtains communication quality parameters of the wireless communication connections via the server transceiver, and seeks the best routing paths between the positioning server and the target wireless device among the wireless devices according to the communication quality parameters of the wireless communication connections.

14. The system as claimed in claim 9, wherein the server processor obtains positioning locations respectively corresponding to the best routing paths, and performs a statistical operation to the positioning locations to obtain the device positioning result.

15. The system as claimed in claim 9, wherein based on the neurons of the another neural network architecture, the server processor obtains semantic features from the last generated feature information,
the server processor compares the semantic features with semantic samples of target feature samples to recognize that the image of the human body is one of the target feature sample.

16. The system as claimed in claim 15, wherein the positioning server establishes a sample database comprising the semantic samples of the target feature samples.

17. A positioning server of detecting a position of a human body in a specific space, wherein a plurality of wireless devices are located in the specific space to form an ad-hoc network, the positioning server comprising:
a server transceiver; and
a server processor, coupled to the server transceiver, and server processor is configured to seek a plurality of best routing paths between the positioning server and a target wireless device among the wireless devices according to communication quality of the wireless devices, wherein the target wireless device comprises an image sensor, a target transceiver, and a target processor,
wherein the server processor is configured to identify a plurality of operating wireless devices among the wireless devices according to the best routing paths,
wherein each of the operating wireless devices comprise an operating transceiver and an operating processor, wherein the best routing paths are respectively formed by wireless communication connections between the plurality of operating wireless devices of the wireless devices, the positioning server and the target wireless device, wherein the positioning server and the target wireless device are two ends of each of the best routing paths, and data is transferred between the positioning server and the target wireless device of one best routing path via one or more operating wireless devices on that one best routing path,
wherein the server processor is configured to estimate a device positioning result of the target wireless device according to the best routing paths, and establishes a wireless network topology formed by the operating wireless devices, wherein the device positioning result indicates a position of the target wireless device in the specific space,
wherein the server processor is configured to establish a neural network architecture by setting the operating wireless devices as a plurality of neurons of the neural network architecture for detecting human body image, wherein the neural network architecture comprises a first layer having a plurality of first neurons, and one or more second layers having a plurality of second neurons, and a third layer having third neurons,
wherein the image sensor of the target wireless device is configured to capture a three-dimensional space image of a space around the target wireless device, wherein all original voxels of the three-dimensional space image are divided into a plurality of partial original voxels by the target processor executing instructions stored in the target memory
wherein the target processor is configured to distribute respectively the plurality of partial original voxels of the three-dimensional space image to the operating transceiver of the first neurons via the target transceiver,
wherein corresponding operating processors of the neurons of neural network architecture are configured to respectively perform image detecting operations to generate a plurality of feature information according to the plurality of partial original voxels and the neural network architecture, wherein a plurality of last generated feature information generated by the third neurons are transmitted to the position server, wherein the server processor is configured to determine whether an image of the human body exists in the three-dimensional space image according to received last generated feature information and a plurality of target feature samples stored in the server memory, wherein in response to determining that the image of the human body exists in the three-dimensional space image, the server processor is configured to determine that the position of the human body is the device positioning result.

18. The positioning server as claimed in claim 17, wherein wireless communication connections between the wireless devices are established according to wireless connection capabilities of the wireless devices, and the server processor obtains communication quality parameters of the wireless communication connections via the server transceiver, and seeks the best routing paths between the positioning server and the target wireless device among the wireless devices according to the communication quality parameters of the wireless communication connections.

19. The positioning server as claimed in claim 17, wherein the server processor obtains positioning locations respectively corresponding to the best routing paths, and performs a statistical operation to the positioning locations to obtain the device positioning result.

20. The positioning server as claimed in claim 17, wherein the server processor establishes a sample database comprising semantic samples of target feature samples, and compares semantic features of the last generated feature information with the semantic samples of the target feature samples to recognize that the image of the human body is one of the human body samples.

* * * * *